W. BROWN.
WHEEL FOR ROAD VEHICLES OR THE LIKE.
APPLICATION FILED DEC. 4, 1917.
1,315,280.
Patented Sept. 9, 1919.
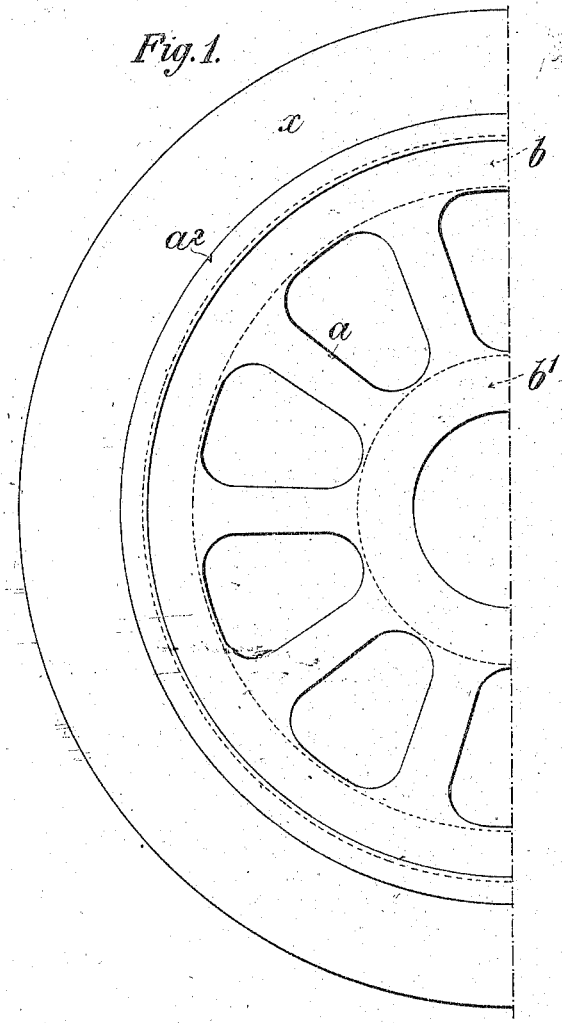
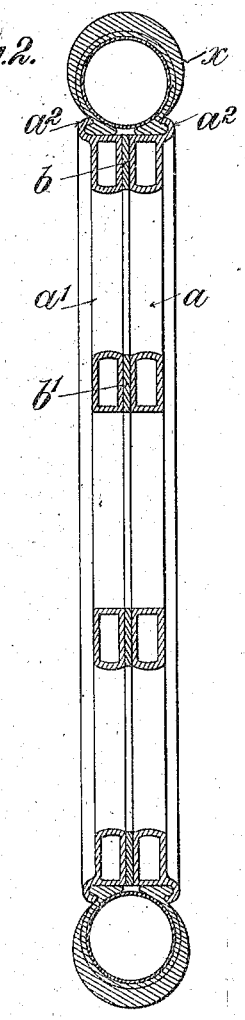
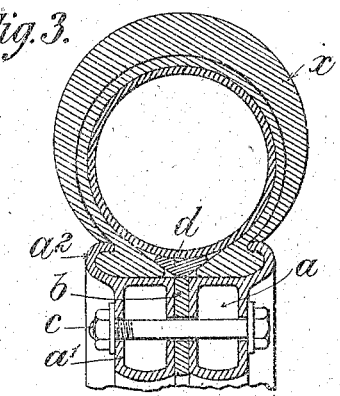
INVENTOR.
W. Brown.

UNITED STATES PATENT OFFICE.

WILLIAM BROWN, OF PETERBOROUGH, ENGLAND.

WHEEL FOR ROAD-VEHICLES OR THE LIKE.

1,315,280.   Specification of Letters Patent.   Patented Sept. 9, 1919.

Application filed December 4, 1917. Serial No. 205,349.

*To all whom it may concern:*

Be it known that I, WILLIAM BROWN, a subject of the King of Great Britain and Ireland, residing at Broadway, Peterborough, in the county of Northampton, England, have invented certain new and useful Improvements in and Relating to Wheels for Road-Vehicles or the like, of which the following is a specification.

This invention relates to wheels for vehicles adapted to carry a single pneumatic or elastic tire of the type in which the wheel is formed of two exactly similar parts adapted to be fixed together in the plane of rotation of the wheel so as to be readily separable and it consists in comprising in each half of the one wheel half of the hub, one half of the felly, one half of each of the spokes and one half of the rim for carrying the elastic tire, each part of the hub of the felly and of each of the spokes being of a hollow formation produced by a process of stamping or pressing and welding and all the elements of each half of the wheel being integral, said two parts being fixed together by means of a series of transverse bolts or the like.

The invention also comprises the use of a packing ring or rings between the two parts of the wheel and a security ring for the tire located in the rim of the wheel.

In the accompanying drawing:—

Figure 1 is a half view in side elevation of a wheel embodying the present invention.

Fig. 2 is a view in section thereof and

Fig. 3 is a broken view—in section on an enlarged scale showing one means for attaching the two parts together and for securing the thickened edges of the tire in position within the incurved edges of the rim. Throughout the views similar parts are marked with like letters of reference.

The wheel consists of two parts or sections $a$, $a^1$ each of which is formed by stamping or pressing and by closing the open side or sides by welding on one or more shaped metallic sheets so as to form one half of the hub, one half of each spoke, one half of the felly and one half of the rim for carrying the tire $x$ which has the usual incurved edge $a^2$ for the reception of the beads or edges of the tire. It will be seen that each half or section of the wheel is of hollow formation both as a whole and as regards the parts forming one half of the hub, one half of each of the spokes and one half of the felly. These two parts or sections $a$, $a^1$ are securely held together in a readily separable manner, preferably by means of transverse bolts conveniently arranged. The meeting or inner faces of the two parts may have a packing ring or rings interposed between them so as to facilitate making a good joint, said packing rings being made of any suitable semi-flexible material such as fiber or vulcanite. The packing ring for each wheel may either be made in one piece properly shaped to coincide with the spoke parts or two separate rings $b$, $b^1$, may be used in which case the parts forming the spokes do not need. Alternatively the packing ring or rings may be dispensed with and the two meeting or inner faces of the parts be machined to insure a good efficient joint, in which case they are either plated or smeared with a suitable material when being assembled to prevent rusting and to facilitate breaking joint. In Fig. 3 the parts $a$, $a^1$, together with the interposed packing ring $b$, are shown held together by a series of transverse through bolts $c$ arranged near the rim. In conjunction with this wheel a security band $d$—the equivalent of the usual bolts employed with rims of the type—described may be employed and is preferably formed in one with the packing ring.

It will be apparent that on separating the two parts $a$ $a^1$ the tire—either a pneumatic tire $x$ as shown or a solid elastic tire—may be readily placed in position on the rim without the use of tools.

What I claim as my invention and desire to secure by Letters Patent is:—

1. A divisible wheel for vehicles adapted to carry a single pneumatic or elastic tire, comprising two similar parts adapted to be fixed together in the plane of rotation of the wheel, each part forming one half of the hub, one half of the felly, one half of each of the spokes, and one half of the rim adapted to carry the tire, the elements of each of said parts forming the hub the felly and the spokes being of hollow formation, and the whole of the elements being integral, a packing ring adapted to lie between the two parts, and a series of transverse bolts for fixing the two parts together.

2. A divisible wheel for vehicles adapted to carry a single pneumatic or elastic tire, comprising two similar parts adapted to be fixed together in the plane of rotation of the wheel, each part forming one half of the hub, one half of the felly, one half of each of the spokes, and one half of the rim, the elements of each of said parts forming the hub, the felly and the spokes being of hollow formation and the whole of the elements of each half being integral, a packing ring adapted to lie between the two hub parts; a packing ring adapted to lie between the felly parts; and transverse bolts for fixing the two halves of the wheel together.

3. A wheel for vehicles adapted to carry a single pneumatic or elastic tire comprising two similar parts $a$ and $a^1$ adapted to be fixed together in the plane of rotation of the wheel each part forming part of the hub, part of the felly, part of each of the spokes and part of the rim for the tire, both the hub, spoke and the felly parts being of hollow formation and the whole of the elements of each part being integral; a packing ring adapted to lie between the two parts of the wheel; means for fixing the two parts of the wheel together; and a security band $d$ adapted to lie in the rim of the wheel.

In testimony whereof I have signed my name.

WILLIAM BROWN.